United States Patent
Song et al.

(10) Patent No.: US 7,673,122 B1
(45) Date of Patent: *Mar. 2, 2010

(54) SOFTWARE HINT TO SPECIFY THE PREFERRED BRANCH PREDICTION TO USE FOR A BRANCH INSTRUCTION

(75) Inventors: Seungyoon Peter Song, East Palo Alto, CA (US); John Gregory Favor, Scotts Valley, CA (US); Richard W. Thaik, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/306,000

(22) Filed: Dec. 16, 2005

Related U.S. Application Data

(60) Provisional application No. 60/749,962, filed on Dec. 12, 2005, provisional application No. 60/721,818, filed on Sep. 29, 2005.

(51) Int. Cl.
*G06F 9/00* (2006.01)
(52) U.S. Cl. ...................... 712/239; 712/240
(58) Field of Classification Search .................. 712/239, 712/240
See application file for complete search history.

(56) References Cited

U.S. PATENT DOCUMENTS

| | | | |
|---|---|---|---|
| 5,093,778 A | 3/1992 | Favor | |
| 5,163,140 A | 11/1992 | Stiles | |
| 5,226,130 A | 7/1993 | Favor | |
| 5,230,068 A | 7/1993 | Van Dyke | |
| 5,327,547 A | 7/1994 | Stiles | |
| 5,454,117 A | 9/1995 | Puziol | |
| 5,511,175 A | 4/1996 | Favor | |
| 5,515,518 A | 5/1996 | Stiles | |
| 5,524,224 A | 6/1996 | Denman | |
| 5,623,614 A | 4/1997 | Van Dyke | |
| 5,644,779 A | 7/1997 | Song | |
| 5,649,137 A | 7/1997 | Favor | |
| 5,687,360 A | * 11/1997 | Chang | ........................ 712/240 |

(Continued)

OTHER PUBLICATIONS

IBM, Welcome to the CICS® US V6.0.1 Information Center, Jun. 13, 2005, Using Configuration Tool section.*

(Continued)

*Primary Examiner*—Eddie P Chan
*Assistant Examiner*—William B Partridge
(74) *Attorney, Agent, or Firm*—Osha • Liang LLP

(57) ABSTRACT

Software hints embedded in branch instructions direct selection of one of a plurality of branch predictors to use when processing the branch instructions, leading to improved branch prediction (i.e. fewer mis-predictions) over conventional schemes. A software agent assembles branch instructions having associated respective branch predictor control fields compatible with a branch predictor selector and a plurality of branch predictors. Each branch predictor control field is used to perform branch predictor selection, branch predictor control, or both. Branch predictor selection enables selective branch prediction according to an appropriate one of the branch predictors as determined by the software agent by examining context surrounding the branch instruction. Branch predictor control enables control of operation of one or more of the branch predictors. For example, a history-based branch predictor may be instructed to provide branch prediction according to a history-depth specified by the branch predictor control.

44 Claims, 6 Drawing Sheets

U.S. PATENT DOCUMENTS

| | | | |
|---|---|---|---|
| 5,748,932 | A | 5/1998 | Van Dyke |
| 5,761,723 | A | 6/1998 | Black |
| 5,805,877 | A | 9/1998 | Black |
| 5,815,699 | A | 9/1998 | Puziol |
| 5,822,577 | A * | 10/1998 | Ekanadham et al. ........ 712/240 |
| 6,009,512 | A * | 12/1999 | Christie ...................... 712/226 |
| 6,067,616 | A | 5/2000 | Stiles |
| 6,108,777 | A | 8/2000 | Puziol |
| 6,247,122 | B1 * | 6/2001 | Henry et al. ................. 712/239 |
| 6,282,639 | B1 | 8/2001 | Puziol |
| 6,360,318 | B1 | 3/2002 | Puziol |
| 6,425,075 | B1 | 7/2002 | Stiles |
| 6,671,798 | B1 * | 12/2003 | Puziol et al. ................ 712/234 |
| 6,938,151 | B2 * | 8/2005 | Bonanno et al. ............ 712/239 |
| 7,203,825 | B2 * | 4/2007 | Hum et al. .................. 712/239 |
| 7,472,263 | B2 * | 12/2008 | Yokoi .......................... 712/239 |
| 2002/0073301 | A1 * | 6/2002 | Kahle et al. ................. 712/235 |
| 2005/0066154 | A1 * | 3/2005 | Chung ........................ 712/239 |
| 2005/0228977 | A1 * | 10/2005 | Cypher et al. ............... 712/240 |
| 2007/0083739 | A1 * | 4/2007 | Glew .......................... 712/239 |

OTHER PUBLICATIONS

Wu, Ming; Cen, Zhiwei; Zhou, Junwei; Exploring Dynamic Branch Prediction Methods; Department of Computer Science and Engineering, Michigan State University, Fall 2002.*

Marius Evers, et al., "An Analysis of Correlation and Predictability: What Makes Two-Level Branch Predictors Work", from Proceedings of the 25th International Symposium on Computer Architecture, Barcelona, Spain, Jun. 1998.

D.A. Jimenez and C. Lin, "Neural Methods for Dynamic Branch Prediction", from ACM Transactions on Computer Systems, 20(4):369-397, Nov. 2002.

IBM; PowerPC® Microprocessor Family: The Programming Environments Manual for 64-bit Microprocessors, Version 3.0; Jul. 15, 2005; pp. 1-19, 41-52, 160-171, 632-640 and 654.

* cited by examiner

Dynamic Branch Predictor -- one of:
 a one-level dynamic branch predictor,
 a history-based dynamic branch predictor,
 a depth-adjustable history-based dynamic branch predictor,
 a two-level global correlated dynamic branch predictor, and
 a two-level address correlated dynamic branch predictor.

5002

Branch Predictor -- includes one of:
 a static taken branch prediction circuit,
 a static not-taken branch prediction circuit,
 a static wait-for-resolution branch prediction circuit,
 a one-level dynamic branch prediction circuit,
 a history-based branch prediction circuit,
 a fixed-depth history-based branch prediction circuit,
 a variable-depth history-based branch prediction circuit,
 a correlated branch prediction circuit,
 a two-level correlated branch prediction circuit,
 a two-level global correlated branch prediction circuit,
 a two-level address correlated branch prediction circuit, and
 a perceptron-based branch prediction circuit.

5003

Dynamic Branch Predictors -- include at least one of:
 a one-level dynamic branch predictor,
 a history-based branch predictor,
 a fixed-depth history-based branch predictor,
 a variable-depth history-based branch predictor,
 a correlated branch predictor,
 a two-level correlated branch predictor,
 a two-level global correlated branch predictor,
 a two-level address correlated branch predictor, and
 a perceptron-based branch predictor.

5088

Static Branch Predictors -- include at least one of:
 a static not-taken branch predictor,
 a static taken branch predictor, and
 a static no-prediction branch predictor.

5089

Branch Predictor Circuits -- include:
 a static taken branch predictor circuit,
 a static not-taken branch predictor circuit,
 a static wait-for-resolution branch predictor circuit,
 a one-level dynamic branch predictor circuit,
 a history-based branch predictor circuit,
 a two-level global correlated branch predictor circuit, and
 a two-level address correlated branch predictor circuit.

SOFTWARE HINT TO SPECIFY THE PREFERRED BRANCH PREDICTION TO USE FOR A BRANCH INSTRUCTION

CROSS REFERENCE TO RELATED APPLICATIONS

Priority benefit claims for this application are made in the accompanying Application Data Sheet. This application incorporates by reference for all purposes the following applications, which are all owned by the owner of the instant application:

U.S. Provisional Application Ser. No. 60/721,818 filed Sep. 29, 2005, by Seungyoon Peter Song, et al., and entitled SOFTWARE HINT TO SPECIFY THE PREFERRED BRANCH PREDICTION TO USE FOR A BRANCH INSTRUCTION

REFERENCES

The references appearing in this paragraph are herein incorporated by reference for all purposes. Additional information regarding branch prediction may be found in "An Analysis of Correlation and Predictability: What Makes Two-Level Branch Predictors Work", by Marius Evers, et al., from *Proceedings of the 25th International Symposium on Computer Architecture*, Barcelona, Spain, June 1998. Additional information regarding dynamic branch prediction may be found in "Neural Methods for Dynamic Branch Prediction", by D. A. Jimenez and C. Lin, from *ACM Transactions on Computer Systems*, 20(4):369-397, November 2002.

BACKGROUND

1. Field

Advancements in branch prediction are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

Studies have shown that no one branch prediction algorithm works well for all cases. Recently proposed adaptive branch prediction mechanisms use multiple branch predictors concurrently and using runtime information gathered by hardware choose a prediction of one predictor that performs the best for each branch. What is needed is a more effective way of using multiple branch predictors.

Branch prediction algorithms known to date may be classified into four types: static, one-level dynamic, two-level global correlated, and two-level per-address correlated. Static prediction assumes that a branch will execute in one fixed direction, either taken or not-taken. Hardware may use a simple algorithm, such as predicting all backward branches to be taken and forward branches to be not-taken, to implement static prediction. Software may also provide the predicted taken or not-taken hint with a prediction bit in each branch instruction. One-level dynamic prediction uses the previous execution history of a branch to predict its outcome, on the assumption that future behavior of the branch is likely to be same as its past. A well-known algorithm is to use a 2-bit saturating counter that increments or decrements on each taken or not-taken outcome, respectively. The prediction is not-taken when the counter is 0 or 1 and taken when the counter is 2 or 3. Two-level global correlated schemes assume that the outcome of a specific branch is related to the outcome of other branches leading to the specific branch. Consider an example code segment:

if (cond1) . . .
if (cond1 AND cond2) . . .

The condition of the second branch is related to the condition of the first branch, and the second branch is taken only if the first branch is taken, thus the outcomes of the two branches are related. A prediction (taken or not-taken) for each branch may be made using a variety of mechanisms, including a two-bit saturating counter or perceptrons. Two-level per-address correlated schemes assume that the outcome of a branch is related to the outcomes of previous executions of the same branch (such as a branch that is taken every third execution). Two-level per-address correlated schemes may be considered an enhancement of the saturating counter scheme due to recognition of a pattern of taken and not-taken outcomes.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF DRAWINGS

FIG. 5 illustrates various attributes of various embodiments of branch predictors.

DETAILED DESCRIPTION

Figure 1:
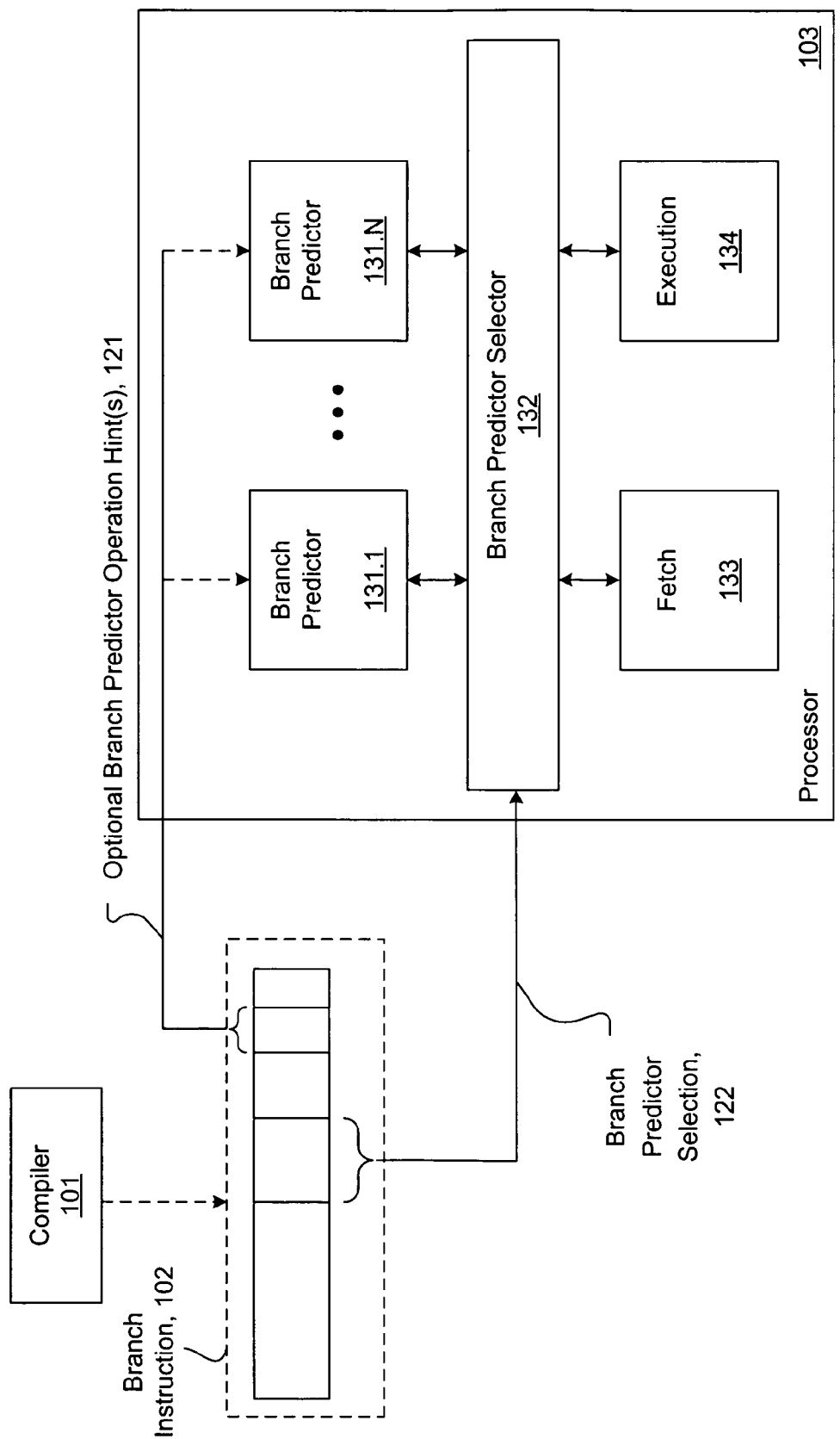
FIG. 1 illustrates selected aspects of an embodiment of a system for branch predictor selection controlled by software.

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Software hints embedded in branch instructions direct selection of one of a plurality of branch predictors to use when processing the branch instructions, leading to improved branch prediction (i.e. fewer mis-predictions) over conventional schemes. According to various embodiments a software agent assembles branch instructions having associated respective branch predictor control fields compatible with a branch predictor selector and a plurality of branch predictors. Each branch predictor control field is used to perform branch predictor selection, branch predictor control, or both. Branch predictor selection enables selective branch prediction according to an appropriate one of the branch predictors as determined by the software agent by examining context surrounding the branch instruction. Branch predictor control enables control of operation of one or more of the branch predictors. For example, a history-based branch predictor may be instructed to provide branch prediction according to a history-depth specified by the branch predictor control.

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first embodiment of a system including a plurality of branch predictors; a branch predictor selector coupled to the branch predictors; and wherein the branch predictor selector selects one of the branch predictors to process a branch instruction based at least in part on predictor information associated with the branch instruction.

The first embodiment wherein the branch predictors include at least first and second dynamic branch predictors. The aforementioned embodiment wherein the branch instruction is a first branch instruction, the predictor information associated with the first branch instruction is first predictor information, and the one of the branch predictors is the first dynamic branch predictor; and wherein the branch predictor selector selects the second dynamic branch predictor to process a second branch instruction based at least in part on second predictor information associated with the second branch instruction. The aforementioned embodiment wherein the branch instructions specify identical branch conditions. The aforementioned embodiment wherein the branch instructions specify identical instruction opcodes. The aforementioned embodiment wherein at least one of the dynamic branch predictors is one of a one-level dynamic branch predictor, a history-based dynamic branch predictor, a depth-adjustable history-based dynamic branch predictor, a two-level global correlated dynamic branch predictor, and a two-level address correlated dynamic branch predictor. The aforementioned embodiment wherein the branch instructions specify identical target addresses.

The first embodiment wherein the branch predictors include at least first and second dynamic branch predictors; wherein the branch instruction is a first branch instruction, the predictor information associated with the first branch instruction is a first predictor information field, and the one of the branch predictors is the first dynamic branch predictor; wherein the branch predictor selector selects the second dynamic branch predictor to process a second branch instruction based at least on a second predictor information field associated with the second branch instruction; wherein the first and the second branches include specifications of respective first and second target addresses; and wherein the first and the second branch instructions differ only in the respective predictor information fields and the respective target address specifications. The aforementioned embodiment wherein the dynamic branch predictors maintain respective dynamic branch predictor state. The aforementioned embodiment wherein the processing of the first branch instruction results in a first predicted direction and the processing of the second branch instruction results in a second predicted direction. The aforementioned embodiment wherein the first and the second predicted directions are unique.

A second embodiment of a system including a plurality of branch predictors; a branch information distributor coupled to the branch predictors; and wherein the branch information distributor provides branch predictor controls to at least one of the branch predictors based at least in part on predictor information associated with a branch instruction. The aforementioned embodiment wherein the branch predictor controls specify a number of past branches to consider when performing history-based branch prediction.

A third embodiment of a system including a plurality of branch predictors; a branch resolution distributor coupled to the branch predictors; and wherein the branch resolution distributor provides branch resolution information produced by execution of a branch instruction to a chosen one of the branch predictors, the chosen branch predictor determined at least in part based on predictor information associated with the branch instruction.

The third embodiment wherein the branch predictors include at least first and second dynamic branch predictors.

The aforementioned embodiment wherein the branch instruction is a first branch instruction, the predictor information associated with the first branch instruction is first predictor information, the branch resolution information is first branch resolution information, and the chosen one of the branch predictors is the first dynamic branch predictor; and wherein the branch resolution distributor provides second branch resolution information produced by execution of a second branch instruction to the second dynamic branch predictor as determined at least in part based on second predictor information associated with the second branch instruction. The aforementioned embodiment wherein the branch instructions specify identical branch conditions. The aforementioned embodiment wherein the branch instructions specify identical instruction opcodes. The aforementioned embodiment wherein at least one of the dynamic branch predictors is one of a one-level dynamic branch predictor, a history-based dynamic branch predictor, a depth-adjustable history-based dynamic branch predictor, a two-level global correlated dynamic branch predictor, and a two-level address correlated dynamic branch predictor. The aforementioned embodiment wherein the branch instructions specify identical target addresses.

The third embodiment wherein the branch predictors include at least first and second dynamic branch predictors; wherein the branch instruction is a first branch instruction, the predictor information associated with the first branch instruction is a first predictor specification, the branch resolution information is first branch resolution information, and the chosen one of the branch predictors is the first dynamic branch predictor; wherein the branch resolution distributor provides second branch resolution information produced by execution of a second branch instruction to the second dynamic branch predictor as determined at least in part based on a second predictor specification associated with the second branch instruction; wherein the first and the second branches include specifications of respective first and second target addresses; and wherein the first and the second branch instructions differ only in the respective predictor specifications and the respective target address specifications. The aforementioned embodiment wherein the dynamic branch predictors maintain respective dynamic branch predictor state. The aforementioned embodiment wherein processing of the first branch instruction results in a first predicted direction and processing of the second branch instruction results in a second predicted direction. The aforementioned embodiment wherein the first and the second predicted directions are unique.

Any of the first, second, and third embodiments wherein at least one of the branch predictors includes at least one of a static taken branch prediction circuit, a static not-taken branch prediction circuit, a static wait-for-resolution branch prediction circuit, a one-level dynamic branch prediction circuit, a history-based branch prediction circuit, a fixed-depth history-based branch prediction circuit, a variable-depth history-based branch prediction circuit, a correlated branch prediction circuit, a two-level correlated branch prediction circuit, a two-level global correlated branch prediction circuit, a two-level address correlated branch prediction circuit, and a perceptron-based branch prediction circuit.

Any of the first, second, and third embodiments wherein at least one of the branch predictors includes branch prediction state conforming to at least one of a fixed-depth history indicative of past branch outcomes organized without regard to addresses of branch instructions, a variable-depth history indicative of past branch outcomes organized without regard to addresses of branch instructions, a fixed-depth history indicative of past branch outcomes organized at least partially with regard to addresses of branch instructions, and a variable-depth history indicative of past branch outcomes organized at least partially with regard to addresses of branch instructions.

Any of the first, second, and third embodiments wherein the predictor information associated with the branch instruction is encoded in at least one of a field of the branch instruction, a prefix associated with the branch instruction, a prefix associated with an instruction executed before the branch instruction, and a branch-predictor-control instruction preceding the branch instruction.

Any of the first, second, and third embodiments further including a compiler to determine the predictor information associated with the branch instruction. Any of the first, second, and third embodiments further including instruction execution logic configured to verify a branch prediction associated with the branch instruction. Any of the first, second, and third embodiments further including instruction fetch logic configured to fetch instructions at least in part according to the branch instruction. Any of the first, second, and third embodiments further including instruction fetch logic configured to fetch instructions at least in part according to one of the branch predictors.

Any of the first, second, and third embodiments wherein the branch predictors are implemented in a processor. The aforementioned embodiment wherein the processor is coupled to a non-volatile storage element. The aforementioned embodiment wherein the non-volatile storage element stores an object code image including the branch instruction.

Any of the first, second, and third embodiments wherein the predictor information is generated by a software agent. The aforementioned embodiment wherein the software agent is a compiler. The aforementioned embodiment wherein the compiler is enabled to recognize a source code program flow idiom including at least one of a rarely taken path, a frequently taken path, a difficult to predict path, and a first flow path associated with a second flow path.

Any of the first, second, and third embodiments wherein the predictor information specifies a not taken branch predictor of the plurality of branch predictors when a rarely taken path is recognized in a source program. Any of the first, second, and third embodiments wherein the predictor information specifies a taken branch predictor of the plurality of branch predictors when a frequently taken path is recognized in a source program. Any of the first, second, and third embodiments wherein the predictor information specifies a no prediction branch predictor of the plurality of branch predictors when a difficult to predict path is recognized in a source program. The aforementioned embodiment wherein the no prediction branch predictor is enabled to direct execution of instructions following the branch instruction to stall until the branch instruction is executed.

Any of the first, second, and third embodiments wherein the predictor information specifies a correlated branch predictor of the plurality of branch predictors when a first flow path is determined to be associated with a second flow path in a source program. The aforementioned embodiment wherein the correlated branch predictor is at least one of a two-level global correlated branch predictor and a two-level address correlated branch predictor.

A fourth embodiment of a method including the steps of recognizing at least a first one and a second one of a plurality of program flow idioms by analyzing program source code; in response to the recognition of the first program flow idiom, generating a first branch predictor preference; in response to the recognition of the second program flow idiom, generating a second branch predictor preference; and wherein the branch predictor preferences are compatible with a plurality of branch predictors included in a processor.

The fourth embodiment wherein each of the branch predictor preferences includes a respective identification of a preferred one of the branch predictors. The aforementioned embodiment wherein at least one of the branch predictor preferences further includes a control field to direct processing of the branch predictor identified by the at least one of the branch predictor preferences. The fourth embodiment wherein at least one of the branch predictor preferences includes a control field to direct processing of at least one of the branch predictors. The aforementioned embodiment wherein the at least one of the branch predictor preferences further includes an identification of the at least one of the branch predictors.

The fourth embodiment further including associating each of the branch predictor preferences with respective branch instructions. The aforementioned embodiment wherein the associating includes at least one of embedding one of the branch predictor preferences in one of the branch instructions, inserting one of the branch predictor preferences into a prefix associated with one of the branch instructions, encapsulating one of the branch predictor preferences into a prefix associated with an instruction previous to one of the branch instructions, and providing one of the branch predictor preferences in a branch prediction control instruction.

The fourth embodiment wherein the program flow idioms include at least one of an infrequently exercised path, a frequently exercised path, a difficult to determine path, and a first path correlated with a second path.

The fourth embodiment further including in the processor, executing a branch instruction. The aforementioned embodiment wherein the executing is responsive to at least one of the branch predictor preferences. The aforementioned embodiment wherein the executing verifies branch prediction information provided by a one of the branch predictors activated in response to the at least one of the branch predictor preferences. The aforementioned embodiment wherein the executing updates branch prediction state maintained by the activated one of the branch predictors.

The fourth embodiment further including in the processor, predicting a branch instruction. The aforementioned embodiment wherein the predicting is responsive to at least one of the branch predictor preferences. The aforementioned embodiment wherein the predicting includes activating a one of the branch predictors as specified by the at least one of the branch predictor preferences. The aforementioned embodiment wherein the predicting includes updating branch prediction state maintained by the activated one of the branch predictors.

A fifth embodiment of a method including the steps of selecting one of a plurality of branch predictors in response to branch predictor control information provided in an instruction stream; predicting a branch instruction of the instruction stream based at least in part on the selected branch predictor.

The fifth embodiment further including executing the branch instruction. The aforementioned embodiment wherein the executing is responsive to the selected branch predictor. The aforementioned embodiment wherein the executing verifies the predicting of the branch instruction. The aforementioned embodiment wherein the executing updates branch predictor state maintained by the selected branch predictor.

A sixth embodiment of a method including the steps of selecting one of a plurality of branch predictors in response to branch predictor control information provided in an instruction stream; updating branch predictor state maintained by the selected branch predictor at least in part based on executing a branch instruction of the instruction stream.

The sixth embodiment further including predicting the branch instruction at least in part according to the selected branch predictor.

Any of the fourth, fifth, and sixth embodiments wherein the branch predictors include at least one of a static not-taken branch predictor, a static taken branch predictor, a static no-prediction branch predictor, a one-level dynamic branch predictor, a history-based branch predictor, a fixed-depth history-based branch predictor, a variable-depth history-based branch predictor, a correlated branch predictor, a two-level correlated branch predictor, a two-level global correlated branch predictor, a two-level address correlated branch predictor, and a perceptron-based branch predictor.

Any of the fifth and sixth embodiments wherein the branch predictor control information is embedded in the branch instruction. Any of the fifth and sixth embodiments wherein the branch predictor control information is embedded in a prefix associated with the branch instruction. Any of the fifth and sixth embodiments wherein the branch predictor control information is embedded in a prefix associated with an instruction of the instruction stream preceding the branch instruction according to execution order of the instruction stream. Any of the fifth and sixth embodiments wherein the branch predictor control information is embedded in a branch predictor control instruction of the instruction stream preceding the branch instruction according to execution order of the instruction stream.

Any of the fifth and sixth embodiments further including operating the selected branch predictor in accordance with at least a portion of the branch predictor control information. The aforementioned embodiment wherein the portion includes a history-depth specification and the selected branch predictor is a variable-depth history-based branch predictor. The aforementioned embodiment wherein the variable-depth history-based branch predictor is capable of operating according to a maximum history depth. The aforementioned embodiment wherein the maximum history depth is greater than a history depth specified by the history-depth specification.

Any of the fifth and sixth embodiments further including operating the selected branch predictor in response to at least a portion of the branch predictor control information; wherein the portion includes a history-depth specification and the selected branch predictor is a variable-depth history-based branch predictor; wherein the variable-depth history-based branch predictor is capable of operating according to a maximum history depth; and wherein the maximum history depth is less than a history depth specified by the history-depth specification. The aforementioned embodiment wherein the variable-depth history-based branch predictor is operated according to the maximum history depth.

A seventh embodiment of a computer readable medium having a set of instructions stored therein which when executed by a processing element causes the processing element to perform steps including predicting a branch instruction in accordance with branch predictor preferences; and wherein the computer readable medium has the branch predictor preferences stored therein.

The seventh embodiment wherein the branch predictor preferences are formatted according to at least one of the branch instruction, a prefix associated with the branch instruction, a prefix associated with an instruction executed before the branch instruction, and a branch predictor control instruction executed before the branch instruction.

The seventh embodiment wherein the branch predictor preferences specify one of a plurality of branch prediction techniques. The aforementioned embodiment wherein the branch prediction techniques include at least two of an always not-taken technique, an always taken technique, a no-prediction technique, a one-level dynamic technique, a history-based technique, a fixed-depth history-based technique, a variable-depth history-based technique, a correlated technique, a two-level correlated technique, a two-level global correlated technique, a two-level address correlated technique, and a perceptron-based technique. The aforementioned embodiment further including updating branch predictor state managed according to the specified branch prediction technique. The aforementioned embodiment further including compiling the branch predictor preferences based on program source.

An eighth embodiment of the aforementioned embodiment wherein the compiling includes determining if the program source includes at least one of an exceptional path, a non-exceptional path, a relatively unpredictable path, and a first decision associated with a second decision. The eighth embodiment wherein in response to the determination of the exceptional path at least one of the branch predictor preferences is specified to choose the always not-taken technique. The eighth embodiment wherein in response to the determination of the non-exceptional path at least one of the branch predictor preferences is specified to choose the always taken technique. The eighth embodiment wherein in response to the determination of the relatively unpredictable path at least one of the branch predictor preferences is specified to choose the no-prediction technique. The eighth embodiment wherein in response to the determination of the associated decisions at least one of the branch predictor preferences is specified to choose one of the correlated techniques.

A ninth embodiment of a computer readable medium having a set of instructions stored therein which when executed by a processing element causes the processing element to perform steps including updating branch predictor state in accordance with branch predictor preferences as applied to a branch instruction; and wherein the computer readable medium has the branch predictor preferences stored therein.

The ninth embodiment wherein the branch predictor preferences are expressed as at least one of a field in the branch instruction, a prefix associated with the branch instruction, a prefix associated with an instruction dynamically preceding the branch instruction according to program flow, and a branch predictor control instruction dynamically preceding the branch instruction according to program flow.

The ninth embodiment further including predicting the branch instruction. The aforementioned embodiment wherein the predicting is according to a branch predictor unit specified by the branch predictor preferences. The aforementioned embodiment wherein the branch predictor state is managed by the specified branch predictor unit. The aforementioned embodiment wherein the specified branch predictor unit is one of a plurality of branch predictor units. The aforementioned embodiment wherein the branch predictor units include at least two of an always not-taken predictor unit, an always taken predictor unit, a stall-until-resolution predictor unit, a one-level dynamic predictor unit, a history-based predictor unit, a fixed-depth history-based predictor unit, a variable-depth history-based predictor unit, a correlated predictor unit, a two-level correlated predictor unit, a two-level global correlated predictor unit, a two-level address correlated predictor unit, and a perceptron-based predictor unit. The aforementioned embodiment further including fetching instructions according to the predicting of the branch instruction.

The ninth embodiment further including executing the branch instruction.

A group of embodiments of a computer readable medium having a set of instructions stored therein which when executed by a processing element causes the processing element to perform steps including processing according to any of the aforementioned embodiments that include all of the limitations of any of the fourth, fifth, and sixth embodiments.

Overview

Software hinting to specify preferred branch prediction to use for a branch instruction includes various techniques of software providing hints for hardware to better predict the outcome of branch instructions. Rather than hinting an outcome (taken or not-taken) of a branch, software hints (or controls) selection from among several branch prediction mechanisms to use with each branch instruction. In some usage scenarios preferred branch prediction selected by software hinting may perform better than other schemes, since software may more easily determine context associated with a branch (such as program structure leading to the branch) than hardware is generally able to extract during runtime. Returning to the above example of the background section, software may determine that the two branches are related and may specify that the global correlated predictor be used for the second branch. Another example is a branch that checks for an exceptional or rare condition, where software may specify that a static not-taken prediction be used for the branch. In some usage scenarios an advantage of providing software hints for branch predictor selection is that each type of branch predictor may perform better than without software hints, since each predictor will process branches that are well suited for prediction by the respective predictor.

The software hint may be provided in several ways. One is to have a bit or bit field in each branch instruction to specify which of a plurality of branch prediction mechanisms to use. Another is to have two bits in each branch instruction to encode four hints: static taken, static not-taken, two-level global correlated mechanism, or two-level per-address mechanism. The two-bit technique provides an effective branch outcome hint when a static prediction is expected to work well and specifies which predictor to use when a dynamic two-level prediction is expected to work well. Another technique is to use a prefix byte (as used in a so-called x86-compatible architecture, for example) that precedes the branch instruction. The prefix byte is not limited to placement immediately before the branch instruction, as it may be placed before other non-branch instructions that precede the branch instruction.

Another technique is to provide an instruction that specifies which branch prediction mechanism to use until changed by executing the same instruction with a different branch prediction mechanism specified.

Some branches are very difficult to predict and better performance or reduced power consumption may result if not predicted. When encountering such a branch instruction, the instruction processing can be stalled until the branch outcome is known. Such a branch is not added to the branch prediction tables, avoiding unnecessary pollution that degrades prediction accuracy. For improved processing of such branches, a bit can be specified with each branch instruction to enable/disable prediction of the branch. Alternatively, this hint can be encoded as one of several options specifying which branch prediction mechanism to use or not use (i.e. one of the plurality of branch predictors is "wait until branch is resolved before continuing execution").

Some branch prediction mechanisms use previous history (or outcomes) of N preceding branches to predict a current branch outcome. Extensive performance analysis may be performed to decide on an efficient value for "N" (the number of preceding branches) but the efficient value for "N" may vary for different applications. A history-based branch predictor may perform better if software provides a hint of what value to use for "N". If the hint specifies a value that is smaller than the maximum value implemented in a design, then the predictor may use the hint to fine-tune the predictor. On the other hand, if the hint specifies a value that is larger than the maximum value implemented in the design, then the predictor may use the maximum value. Such a hint may be provided with each branch instruction. Alternatively, the value may be encoded as a sub-field via any of the aforementioned mechanisms for specifying which predictor to use.

Various implementations may include any combination of branch predictors for selection and/or control by the software hints included in branch instructions. The branch predictors include static (taken, not-taken, wait-for-resolution), one-level dynamic, history-based, two-level global correlated, two-level per-address correlated, and perceptron-based.

System

FIG. 1 illustrates selected aspects of an embodiment of a system for branch predictor selection controlled by software. The illustrated embodiment includes software (Compiler 101) and an execution vehicle (Processor 103) to execute object code produced by the software. The processor includes a plurality of units for providing expected outcomes of control flow instructions (Branch Predictors 131.1 ... 131.N) and a unit for choosing one of the branch predictors to use for processing a branch instruction (Branch Predictor Selector 132). The processor also includes hardware for fetching and executing instructions (Fetch unit 133 and Execution unit(s) 134, respectively). The software is enabled to analyze source code (such as assembler, high-level language, and other similar representations of program flow and operations) to generate the object code. The object code includes one or more instances of control flow instructions (exemplified by Branch Instruction 102). The branch instruction includes control information relating to branch prediction. The control information includes a field to specify which of the branch predictors (or none) to use when predicting outcomes of the branch instruction (Branch Predictor Selection 122). The control information may also include Optional Branch Predictor Operation Hint(s) 121 used to control the branch predictors.

In operation Compiler 101 parses source code and generates instructions, such as Branch Instruction 102 for execution by Processor 103. The compiler may analyze context associated with the generation of the branch instruction to determine an appropriate branch predictor to use when executing the branch instruction. The processor implements one or more aspects of speculative execution, including branch prediction (such as predicting a conditional branch as taken or not-taken) when processing control flow instructions such as the branch instruction. Instructions are retrieved for consumption by the processor by Fetch unit 133 at least in part according to branch prediction information provided by one of Branch Predictors 131.1 ... 131.N. A specific one of the branch predictors is chosen at least in part by Branch Predictor Selector 132 that is in turn responsive to Branch Predictor Selection 122 (a field of the branch instruction). The chosen branch predictor may also be optionally controlled in part by Optional Branch Predictor Operation Hint(s) 121 (also a field of the branch instruction). Operations in accordance with the fetched instructions, including determining branch outcomes (such as direction and target address), are performed by Execution unit(s) 134. The determined branch outcomes are compared to the predicted outcomes and results of the comparisons fed back to the chosen branch predictor via the branch predictor selector as specified by the branch predictor selection field of the branch instruction.

Operation

Figure 2:
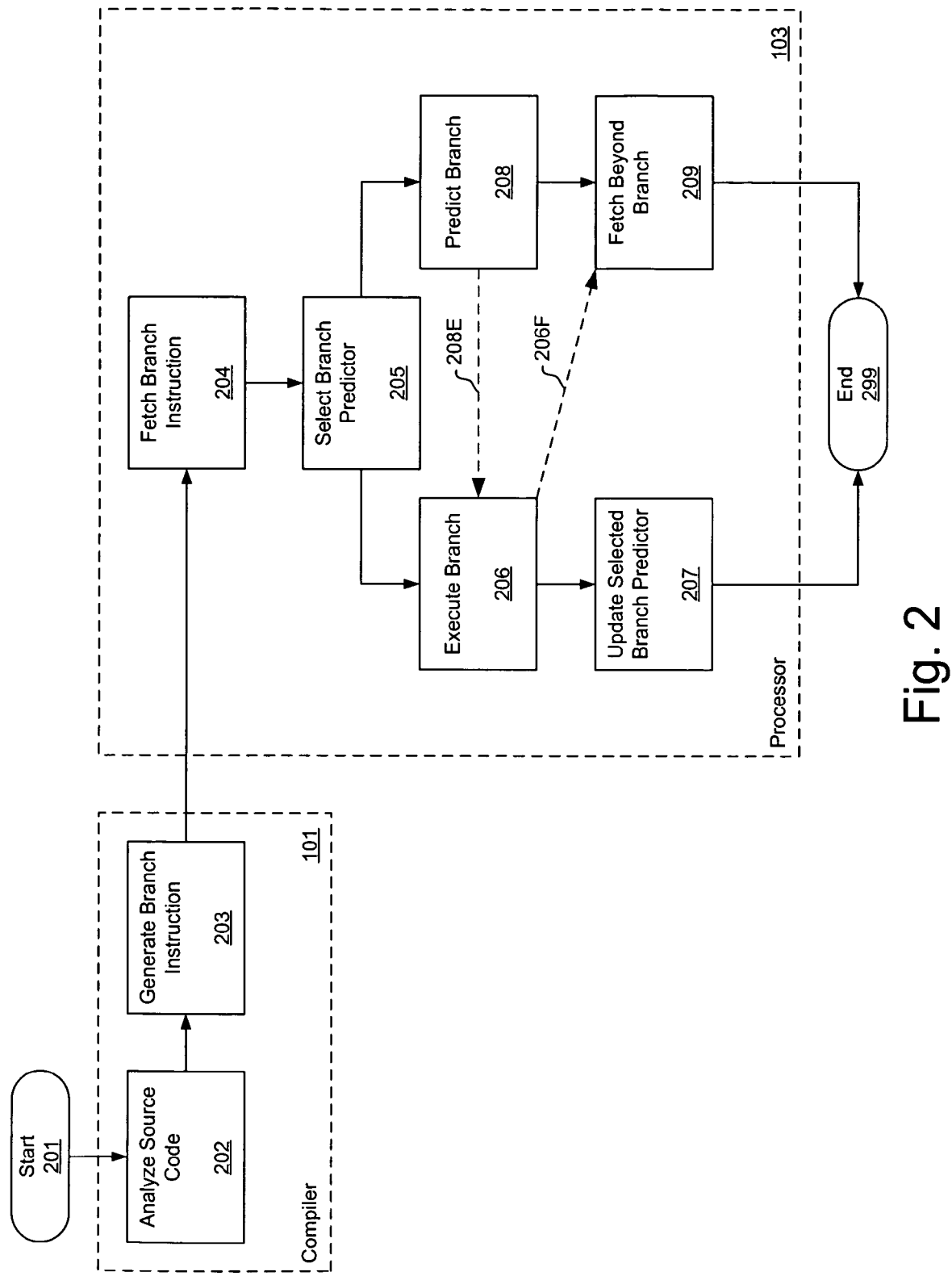
FIG. 2 conceptually illustrates portions of operation of an embodiment of software-directed branch processing.

FIG. 2 conceptually illustrates portions of operation of an embodiment of software-directed branch processing as performed by Compiler 101 and Processor 103 of FIG. 1, including processing source code to object code having a branch instruction and subsequent execution of the object code. The illustration is representative of processing relating to a single control-flow operation and a corresponding branch, and is repeated as necessary for a plurality of control-flow operations and respective branches. In some usage scenarios processing performed by the compiler may be substantially separated in time with respect to functions performed by the processor. In some implementations functions performed by the processor may be wholly or partially overlapped (i.e. performed somewhat in parallel) for more than one branch instruction. In some implementations and circumstances one control-flow operation may correspond to two or more branches. The source code may vary by implementation, and may take forms including any combination of assembler, high-level language (such as C, Pascal, Fortran, and so forth), and other representations of programmed functionality.

Flow begins in Compiler 101 at ("Start" 201) and proceeds to parse source code ("Analyze Source Code" 202) to determine appropriate instructions to produce for execution by an execution vehicle (such as Processor 103) to perform functions described by the source code. Context around a control-flow operation is analyzed, various constructs are recognized if possible, and recognition results are recorded. The constructs include "if" statements and possible interrelationships with respect to each other, idioms recognizable as checks for rare or exceptional circumstances, looping and similar iteration statements, and other similar program sequencing determining source statements. Then an appropriate branch instruction (or plurality of branch instructions, according to usage scenario or embodiment) is determined and produced for the control-flow operation ("Generate Branch Instruction" 203), in part based on the analyzed context.

The generated branch instruction includes information to control a choice of branch predictor (such as Branch Predictor Selection 122 of FIG. 1). The generated branch instruction may also include additional predictor control information to deliver to the chosen branch predictor (such as Optional Branch Predictor Operation Hint(s) 121 of FIG. 1). Object code for the branch instruction is included with object code for other instructions (including other branch instructions) as required according to the source code, and the object code is made available for execution. Note that in some usage scenarios compiling is performed on the same processor as resultant object code is executed on, and in some usage scenarios compiling and execution are performed on different computers and hence processors.

Having produced object code, flow related to the branch instruction then continues (perhaps substantially later in time) in Processor 103, beginning with retrieving the branch instruction for execution from memory, such as any combination of main memory, cache memory, and so forth ("Fetch Branch Instruction" 204). The branch predictor selection information included in the branch instruction is used to choose an appropriate one of a plurality of branch predictors implemented in the processor to predict the branch instruction ("Select Branch Predictor" 205).

In some embodiments or usage scenarios, flow then proceeds in parallel to perform operations to determine the "actual" outcome of the branch ("Execute Branch" 206) and to forecast the outcome of the branch ("Predict Branch" 208). The determining of the outcome of the branch may include calculating a result of a conditional test such as comparing an operand to zero (or non-zero). Predicting the outcome of the branch may include providing an expected direction such as taken (or not-taken), optionally after consulting branch predictor state, according to the chosen branch predictor. After executing the branch, selected state in the chosen branch predictor is modified according to the outcome of the branch ("Update Selected Branch Predictor" 207). After predicting the branch, subsequent instructions are fetched, according to the prediction of the branch ("Fetch Beyond Branch" 209). The subsequent instructions may be from the target of the branch if the branch is predicted taken (or sequentially if the branch is predicted not-taken). After updating the selected branch predictor and after fetching beyond the branch, then processing is complete ("End" 299).

In some embodiments or usage scenarios, after the selected branch predictor is chosen ("Select Branch Predictor" 205), flow proceeds first to provide an assumed branch outcome ("Predict Branch" 208) and then flows to determine the branch outcome ("Execute Branch" 206) as illustrated by dashed-arrow 208E. For example, executing the branch may be dependent on a predicted direction. In some embodiments obtaining instructions following the branch ("Fetch Beyond Branch" 209) is dependent upon the outcome of the branch ("Execute Branch" 206) as illustrated by dashed-arrow 206F. For example, instructions following a conditional branch are dependent on the actual direction of the conditional branch, and are thus determined in part by the outcome of the branch. These and all similar variations are contemplated.

Preference Determination

Figure 3:
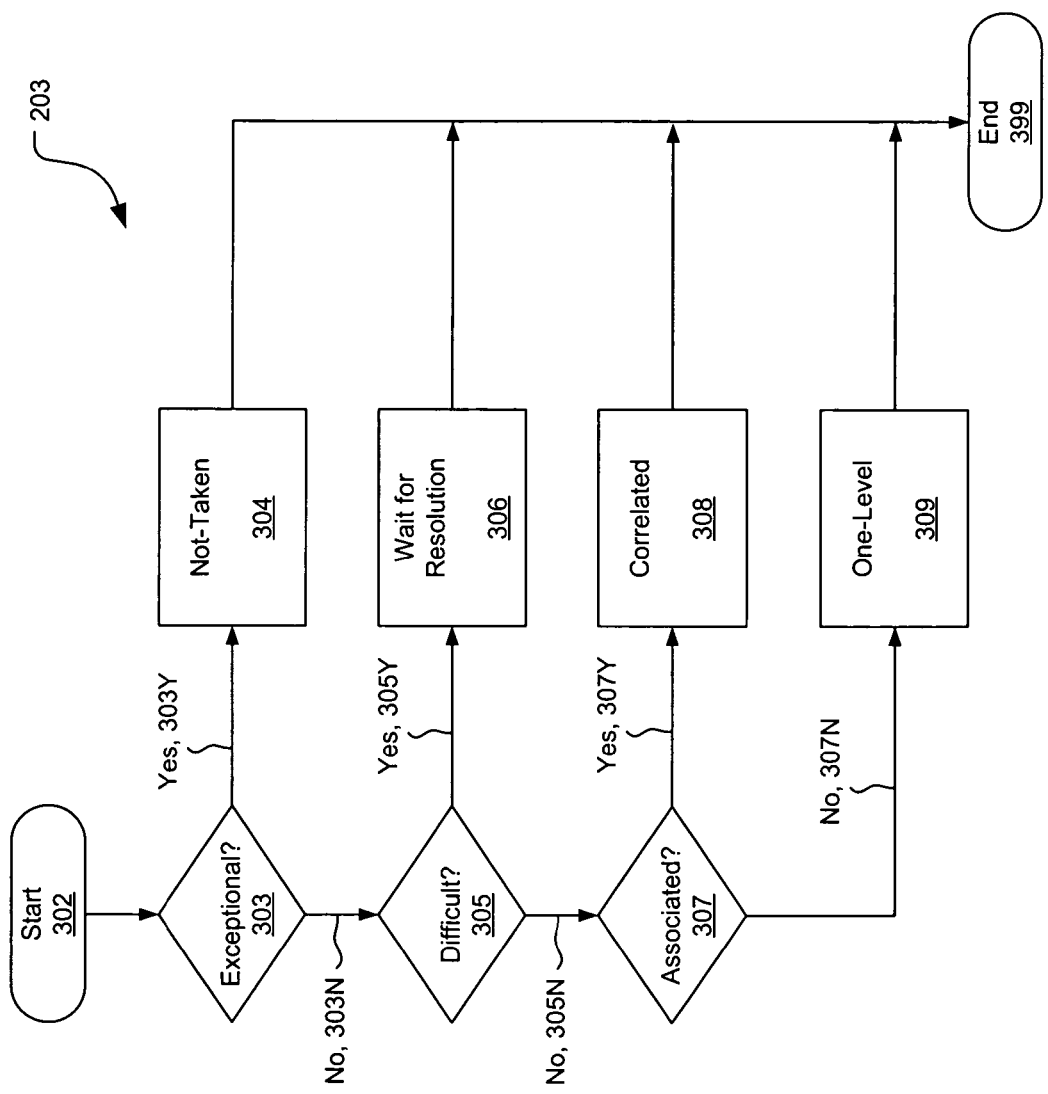
FIG. 3 illustrates selected aspects of software selection of an appropriate branch predictor.

FIG. 3 illustrates selected aspects of software selection of an appropriate branch predictor, such as processing relating to "Generate Branch Instruction" 203 of FIG. 2. The object of the flow is to determine an appropriate branch predictor for a control-flow operation specified or described by source code (i.e. to compute a preferred branch prediction mechanism). Flow begins ("Start" 302) and proceeds to ascertain if the control-flow operation is in a context recognizable as a rare or unusual event ("Exceptional?" 303). If so, then flow proceeds ("Yes" 303Y) to generate a branch predictor selection corresponding to predicting that the next instruction dynamically executed following the branch is the next instruction sequentially following the branch ("Not Taken" 304). The generated branch predictor selection is then embedded in an appropriate branch instruction (or prefix) according to the control-flow operation requirements and generation of the branch instruction corresponding to the control-flow operation is then complete ("End" 399). Note that later, during execution and prediction of the branch by the processor, selecting a not-taken predictor enables execution down the most likely path and eliminates pollution of other branch predictors.

If a rare or unusual event context is not recognized ("No" 303N), then flow proceeds to test whether the control-flow operation and surrounding context correspond to situations or circumstances that are relatively unpredictable ("Difficult?" 305). If so, then flow proceeds ("Yes" 305Y) to generate a branch predictor selection corresponding to "not predicting", i.e. waiting to process instructions after the branch until the outcome of the branch is known ("Wait for Resolution" 306). The generated branch predictor selection is then embedded in an appropriate branch instruction (or prefix) and processing is then complete ("End" 399). Note that later, during execution and prediction of the branch by the processor, selecting a not-predicting predictor (i.e. waiting to fetch/execute past the branch until the branch outcome is available) conserves execution resources, reduces power consumption executing instructions likely to be incorrect, and avoids wasting resources of other branch predictors on a branch unlikely to be predicted properly.

If a relatively unpredictable context is not recognized ("No" 305N), then flow proceeds to discover if the control-flow operation and context matches a situation where branch outcomes are related, such as a later branch outcome partially determined or associated with an earlier branch outcome ("Associated?" 307). If so, then flow proceeds ("Yes" 307Y) to generate a branch predictor selection corresponding to a correlated branch predictor ("Correlated" 308). In some embodiments the correlated branch predictor is global correlated. In some embodiments the correlated branch predictor is address correlated. In some embodiments further processing of the control-flow operation and related context guides selection of one of a plurality of correlated branch predictors, such as global and address correlated predictors. The generated branch predictor selection is then embedded in an appropriate branch instruction (or prefix) and processing is then complete ("End" 399).

If a related control-flow circumstance is not detected ("No" 307N), then flow proceeds to generate an assumed a branch predictor selection such as a single-level dynamic predictor ("One-Level" 309). The generated branch predictor selection is then embedded in an appropriate branch instruction (or prefix) and processing is then complete ("End" 399).

The processing illustrated in the figure is illustrative only, and other control-flow and context recognition processing may be performed, according to implementation. In addition, one or more of the illustrated elements may not be present in some implementations.

In some embodiments one or more optional branch predictor operation hints may be embedded in the branch instruction (or prefix) during processing related to "Generate Branch Instruction" 203. The hints may be developed in conjunction with branch predictor selection based on the control-flow operation and related context.

Computing System

Figure 4:
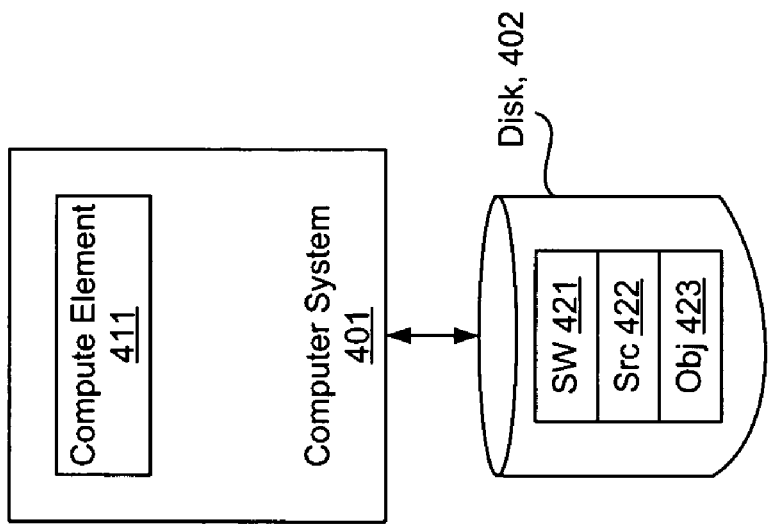
FIG. 4 illustrates selected details of an embodiment of a computing system to execute software routines to perform software selection of an appropriate branch predictor.

FIG. 4 illustrates selected details of an embodiment of a computing system to execute software routines to perform software selection of an appropriate branch predictor. The computing system includes Computer System 401 coupled to Disk 402. The computer system includes Compute Element 411 enabled to execute software routines made available from the disk as any portion of machine-readable executable files included in SoftWare (SW) image 421. The SW may include one or more implementations of any portion of Compiler 101 (of FIG. 1). In operation the SW is executed by the compute element and analyzes one or more program files such as Source Code (Src) 422. The SW generates instructions including one or more branch instructions having respective embedded branch predictor selections (and respective optional branch predictor operation hints). The generated instructions are stored as one or more object code files such as Object Code (Obj) 423. The object code is compatible with execution by an instruction processing element such as Processor 103 (of FIG. 1). In some embodiments Compute Element 411 is implemented by all or a portion of Processor 103.

In general with respect to embodiments and variations thereof as exemplified in the aforementioned figures, in some embodiments one of the branch predictors is a history-based branch predictor. In some embodiments one of the branch predictors is a depth-adjustable history-based branch predictor, enabled to predict branches based on a configurable number of past branches, and in some implementations the optional branch predictor operation hint specifies to the depth-adjustable history-based branch predictor how many branches back in time to consider when predicting a branch.

In general the branch predictors may include any combination of:
- a static taken predictor (always predicts taken);
- a static not-taken predictor (always predicts sequential flow);
- a non-predictor that requires resolution of the branch before (speculatively) executing beyond the branch (i.e. execution beyond the branch is prevented until the branch outcome is known), and also prevents the branch from affecting any state associated with any branch predictors;
- a one-level dynamic branch predictor;
- a history-based branch predictor;
- a depth-adjustable history-based branch predictor;
- a two-level global correlated branch predictor;
- a two-level address correlated branch predictor; and
- a perceptron-based branch predictor.

FIG. 5 illustrates various attributes of various embodiments of branch predictors, such as any one or more of Branch Predictors 131.1 ... 131.N of FIG. 1.

Figure 6:
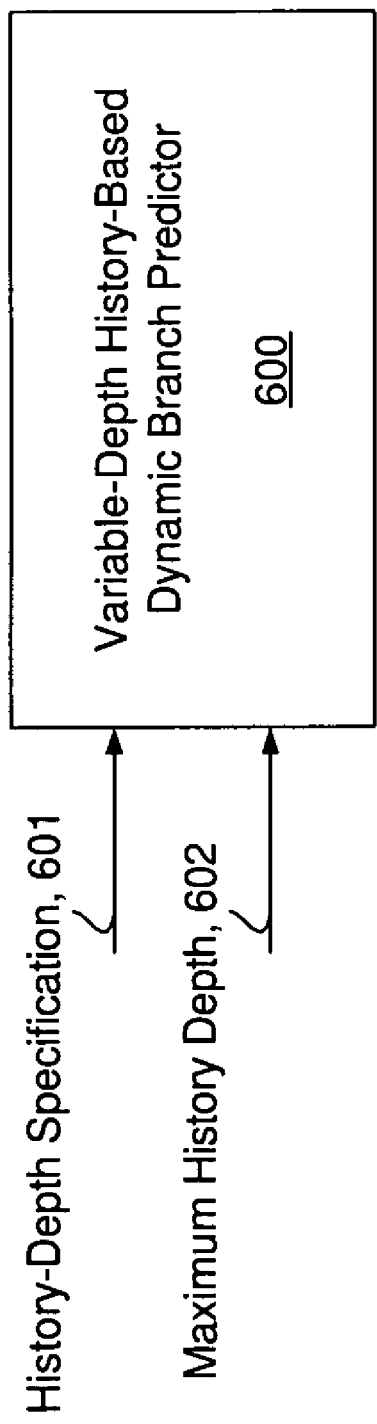
FIG. 6 illustrates various attributes of a variable-depth history-based dynamic branch predictor.

FIG. 6 illustrates various attributes of a variable-depth history-based dynamic branch predictor, such as selected by "Select Branch Predictor" 205 of FIG. 2.

In some embodiments one or more of the aforementioned branch predictors may be used to process a specific type of branch instruction, and unique instances of the specific type of branch instruction may be processed by unique predictors. The predictors may be static, dynamic, or any combination thereof. For example, a first instance of a branch-if-zero conditional branch may be processed by a history-based branch predictor, as directed by the branch predictor selection field of the first instance of the branch-if-zero conditional branch instruction. Continuing with the example, a second instance of a branch-if-zero conditional branch may be processed by a two-level global correlated branch predictor, as directed by the branch predictor selection field of the second instance. Continuing with the example, first and second instances of a branch-if-no-zero conditional branch may be processed by a two-level address correlated branch predictor, while a third instance of the branch-if-not-zero conditional branch may be processed by the history-based branch predictor. These and all similar variations are contemplated.

In some embodiments the branch predictor selection and optional branch predictor operation hints are provided directly in the branch instruction (as illustrated by Branch Predictor Selection 122 and Optional Branch Predictor Operation Hint(s) 121 embedded in Branch Instruction 102). In some embodiments any combination of the branch predictor selection and the optional branch predictor operation hints are provided in a special instruction appearing before (with respect to program order) a branch instruction to be affected by the selection and operation hints. In some embodiments any combination of the selection and the operation hints are provided in a prefix associated with a branch instruction to be affected or in a prefix associated with a non-branch instruction preceding the branch instruction to be affected. In some embodiments a dedicated instruction conveys the selection and operation hint information, and the information is used when processing all or a predetermined subset of subsequent branch instructions, until overridden or changed by execution of another instance of the dedicated instruction.

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the number and type of branch instructions; the number, width, and organization of branch hint fields in branch instructions; and the number of entries or stages in registers and buffers), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing applications, and are not limited to the particular application or industry of the illustrated embodiments. The invention is thus to be construed as including all possible modifications and variations encompassed within the scope of the claims appended to the issued patent.

What is claimed is:

1. A system comprising:
   a branch instruction;
   a prefix attached to the branch instruction and comprising:
      a first control field having a branch predictor selection; and
      a second control field having a branch predictor operation hint;
   a plurality of branch predictors; and
   a branch predictor selection circuit (BPSC) coupled to the plurality of branch predictors and configured to select a branch predictor, using the branch predictor selection, to predict an outcome of the branch instruction using the branch predictor operation hint,
   wherein the plurality of branch predictors includes the branch predictor,
   wherein the outcome is predicted after the branch predictor is selected by the BPSC,
   wherein only the selected branch predictor of the plurality of branch predictors outputs a prediction,
   wherein a branch predictor operation hint controls the selected branch predictor,
   wherein at least two of the branch predictors are dynamic branch predictors having respective associated distinct branch prediction state storages, and
   wherein the plurality of branch predictors and the BPSC are implemented in a processor that is capable of executing the branch instruction.

2. The system of claim 1 wherein at least one of the dynamic branch predictors is one of
   one-level dynamic branch predictor,
   a history-based dynamic branch predictor,
   a depth-adjustable history-based dynamic branch predictor,
   a two-level global correlated dynamic branch predictor, and
   a two-level address correlated dynamic branch predictor.

3. The system of claim 1 wherein at least one of the branch predictors comprises one of
   a static taken branch prediction circuit,
   a static not-taken branch prediction circuit,
   a static wait-for-resolution branch prediction circuit,
   a one-level dynamic branch prediction circuit,
   a history-based branch prediction circuit,
   a fixed-depth history-based branch prediction circuit,
   a variable-depth history-based branch prediction circuit,
   a correlated branch prediction circuit,
   a two-level correlated branch prediction circuit,
   a two-level global correlated branch prediction circuit,
   a two-level address correlated branch prediction circuit, and
   a perceptron-based branch prediction circuit.

4. The system of claim 1 further comprising a compiler to compute the branch instruction and the prefix attached to the branch instruction.

5. The system of claim 4 wherein the compiler further computes a number of past branches to consider when operating one of the dynamic branch predictors.

6. The system of claim 1 further comprising a branch resolution distribution circuit coupled to at least a portion of the branch predictors, enabled to activate a selected one of the dynamic branch predictors in response to the branch predictor selection, and further enabled to provide the activated branch predictor with execution results of the branch instruction.

7. A system comprising:
   a branch instruction;
   a prefix attached to the branch instruction and comprising:
      a first control field having a branch predictor selection; and
      a second control field having a branch predictor operation hint;
   a plurality of branch predictors; and
   a branch predictor selector (BPS) coupled to the plurality of branch predictors and configured to select a branch predictor, using the branch predictor selection, to predict an outcome of the branch instruction using the branch predictor operation hint,
   wherein the plurality of branch predictors includes the branch predictor,
   wherein the outcome is predicted after the branch predictor is selected by the BPS,
   wherein only the selected branch predictor of the plurality of branch predictors outputs a prediction,
   wherein a branch predictor operation hint controls the selected branch predictor,
   wherein at least two of the branch predictors are dynamic branch predictors having respective associated distinct branch prediction state storages; and
   wherein the plurality of branch predictors and the BPS are implemented in a processor that is enabled to execute the branch instruction.

8. The system of claim 7 further comprising a compiler to determine the branch instruction and the prefix attached to the branch instruction.

9. The system of claim 7 wherein the one of the branch predictors is a first one of the two dynamic branch predictors, the branch predictor selection is a first branch predictor selection, the branch instruction is a first branch instruction, and the branch predictor selector is enabled to select a first one of the two dynamic branch predictors in response to the first branch predictor selection and further enabled to select a second one of the two dynamic branch predictors in response to a second branch predictor selection associated with a second branch instruction.

10. The system of claim 9 wherein the branch instructions are responsive to identical branch conditions.

11. The system of claim 9 wherein the branch instructions have identical instruction opcodes.

12. The system of claim 9 wherein the branch instructions have identical branch targets.

13. The system of claim 7 wherein the branch predictor selection specifies a not taken branch predictor of the plurality of branch predictors when a rarely taken path is recognized in a source program.

14. The system of claim 7 wherein the branch predictor selection specifies a taken branch predictor of the plurality of branch predictors when a frequently taken path is recognized in a source program.

15. The system of claim 7 wherein the branch predictor selection specifies a no prediction branch predictor of the plurality of branch predictors when a difficult to predict path is recognized in a source program.

16. The system of claim 7 wherein the branch predictor selection specifies a correlated branch predictor of the plurality of branch predictors when a first flow path is determined to be associated with a second flow path in a source program.

17. A method comprising:
   obtaining a branch instruction and a prefix attached to the branch instruction from a plurality of branch instructions, wherein the prefix comprises a first control field having a branch predictor selection, and wherein the prefix further comprises a second control field having a branch predictor operation hint;

select a dynamic branch predictor from a plurality of dynamic branch predictors based on the branch predictor selection;

predicting, using the branch predictor, an outcome of the branch instruction based on the branch predictor operation hint after selecting the branch predictor, wherein only the selected branch predictor of the plurality of branch predictors outputs a prediction, wherein a branch predictor operation hint controls the selected branch predictor, wherein each of the dynamic branch predictors maintain respective branch prediction state.

18. The method of claim 17 wherein the plurality of branch instructions specify identical branch conditions.

19. The method of claim 17 wherein the plurality of branch instructions specify identical branch instruction opcodes.

20. The method of claim 17 wherein the plurality of branch instructions specify identical branch target addresses.

21. The method of claim 17 further comprising executing the branch instruction.

22. The method of claim 21 wherein the executing is responsive to the selected dynamic branch predictor.

23. The method of claim 22 wherein the executing verifies the predicting of the branch instruction.

24. The method of claim 23 wherein the executing updates the branch prediction state.

25. A method comprising:
selecting a first one and a second one of a plurality of dynamic branch predictors respectively in response to first and second branch predictor controls provided in an instruction stream;
updating first and second branch predictor state tables maintained respectively by the first and the second dynamic branch predictors based at least in part on respectively executing first and second branch instructions,
wherein only the first and second branch predictor of the plurality of dynamic branch predictors outputs a prediction for the first and second branch instructions respectively; and
wherein the first branch predictor control is provided in a prefix associated with the first branch instruction.

26. The method of claim 25 wherein the branch instructions specify identical branch conditions.

27. The method of claim 25 wherein the branch instructions specify identical branch instruction opcodes.

28. The method of claim 25 wherein the branch instructions specify identical branch target addresses.

29. The method of claim 25 further comprising executing the branch instructions.

30. The method of claim 29 wherein the executing is responsive to the selected dynamic branch predictors.

31. The method of claim 30 wherein the executing verifies branch predictions made for branch instructions.

32. The method of claim 25 further comprising predicting the first and the second branch instructions respectively at least in part according to the first and the second dynamic branch predictors.

33. The method of claim 17 wherein the dynamic branch predictors comprise at least one of
a one-level dynamic branch predictor,
a history-based branch predictor,
a fixed-depth history-based branch predictor,
a variable-depth history-based branch predictor,
a correlated branch predictor,
a two-level correlated branch predictor,
a two-level global correlated branch predictor,
a two-level address correlated branch predictor, and
a perceptron-based branch predictor.

34. The method of claim 17 further comprising:
selecting one of a plurality of static branch predictors in response to branch predictor controls provided in the instruction stream; and
wherein the static branch predictors comprise at least one of
a static not-taken branch predictor,
a static taken branch predictor, and
a static no-prediction branch predictor.

35. The method of claim 17 further comprising operating the dynamic branch predictor in accordance with at least a portion of the branch predictor controls.

36. The method of claim 17 further comprising operating the dynamic branch predictor in accordance with a history-depth specification included in at least a portion of the branch predictor controls.

37. The method of claim 17 further comprising operating the dynamic branch predictor in accordance with a history-depth specification included in at least a portion of the branch predictor controls and wherein the dynamic branch predictor is a variable-depth history-based branch predictor capable of operating according to a maximum history depth that is less than the history-depth specification.

38. The method of claim 17 further comprising operating the dynamic branch predictor in accordance with a history-depth specification included in at least a portion of the branch predictor controls and wherein the dynamic branch predictor is a variable-depth history-based branch predictor capable of operating according to a maximum history depth that is greater than the history-depth specification.

39. The method of claim 25 wherein the dynamic branch predictors comprise at least one of
a one-level dynamic branch predictor,
a history-based branch predictor,
a fixed-depth history-based branch predictor,
a variable-depth history-based branch predictor,
a correlated branch predictor,
a two-level correlated branch predictor,
a two-level global correlated branch predictor,
a two-level address correlated branch predictor, and
a perceptron-based branch predictor.

40. The method of claim 25 further comprising:
selecting one of a plurality of static branch predictors in response to branch predictor controls provided in the instruction stream; and wherein the static branch predictors comprise at least one of
a static not-taken branch predictor,
a static taken branch predictor, and
a static no-prediction branch predictor.

41. The method of claim 25 further comprising operating the first dynamic branch predictor in accordance with at least a portion of the first branch predictor controls.

42. The method of claim 25 further comprising operating the first dynamic branch predictor in accordance with a history-depth specification included in at least a portion of the first branch predictor controls.

43. The method of claim 25 further comprising operating the first dynamic branch predictor in accordance with a history-depth specification included in at least a portion of the first branch predictor controls and wherein the first dynamic branch predictor is a variable-depth history-based branch predictor capable of operating according to a maximum history depth that is less than the history-depth specification.

44. The method of claim 25 further comprising operating the first dynamic branch predictor in accordance with a history-depth specification included in at least a portion of the first branch predictor controls and wherein the first dynamic branch predictor is a variable-depth history-based branch predictor capable of operating according to a maximum history depth that is greater than the history-depth specification.

* * * * *